Feb. 5, 1929.
P. DUBRAY
1,701,032
ATOMIZER
Filed July 9, 1927
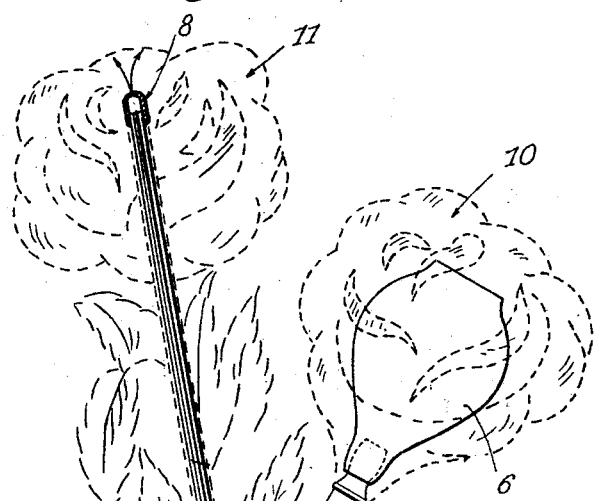
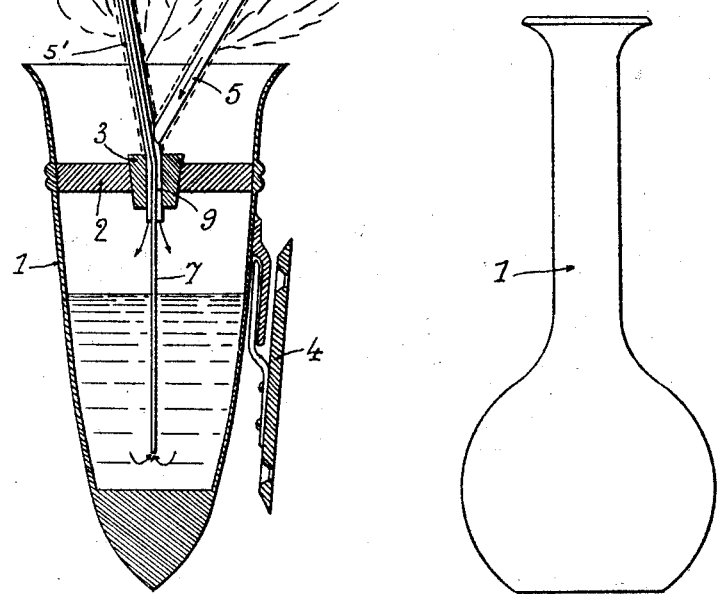
PIERRE DUBRAY
INVENTOR
BY Otto Munk
HIS ATTY.

Patented Feb. 5, 1929.

1,701,032

UNITED STATES PATENT OFFICE.

PIERRE DUBRAY, OF PARIS, FRANCE.

ATOMIZER.

Application filed July 9, 1927, Serial No. 204,535, and in Germany July 14, 1926.

Atomizers generally comprise a receptacle for containing the liquid to be atomized, means for exerting a pressure upon said liquid and means for evacuating the liquid under pressure and atomize it into the atmosphere.

This invention consists essentially in hiding the pressing and evacuating means as well as the atomizing means amongst artificial flowers and their stalks.

The accompanying drawing shows, by way of example, one embodiment of the invention.

Fig. 1 shows the general arrangement of the atomizer.

Fig. 2 shows another form of receptacle.

In the embodiment shown in Fig. 1, the receptacle 1, which contains the liquid to be atomized, has, on the one hand, a part 2 of restricted cross section for receiving a plug 3 and on the other hand a base plate 4, which allows of its being fixed to any wall whatever by means of screws for instance. The plug 3 is provided with a central recess 9 into which opens a tube 5 connecting the bulb 6 with the inside of the receptacle 1 and with tube 5'. Through the interior of said recess and tube 5' passes a slender conduit 7. This latter dives down to almost the bottom of the receptacle 1. This conduit also connects the nozzle 8 with the interior of the receptacle.

The bulb 6 is hidden in an artificial flower 10 of which it forms the central part and simulates that part of the flower which is not yet opened; the tubes 5 and 5' are also hidden under a thin strip which gives them the appearance of flower stalks.

The nozzle 8 may be made to resemble the pistil or a stamin of the flower 11 surrounding it.

The apparatus shown works as follows: By pressing the flower 10 i. e. upon the bulb 6, an overpressure is produced upon the surface of the liquid due to the tightness of the plug 3 upon its seat 2, thus the liquid is caused to ascend in the tube 7 and is atomized into the atmosphere when escaping from the nozzle 8 with the air which passes thru tip 8 from tubes 5 and 5' as is well known.

To increase the resemblance with flowers disposed in a vase, artificial flowers and even other flower stalks will be disposed with advantage upon the stalks 5 and 5'.

The present invention may be applied to all kinds of atomizers whatever may be the form of their receptacle. For instance the receptacle 1 might receive the shape shown Fig. 2.

Obviously, the artificial flowers may be made of any suitable material; however they will be preferably made with petals of india rubber which will be unaffected by contact with the fingers. The liquid or perfume contained in the receptacle 1 will preferably be that of the flower within which the parts of the atomizer are concealed.

Having now described my invention, what I claim as new and desire to secure by Letters Patent is:

As a new article of manufacture an atomizer comprising in combination an elastic bulb arranged to produce a pressure upon the liquid to be atomized, a nozzle for atomizing the liquid thus placed under pressure, an artificial flower the central nonopened part of which is formed by said bulb and another artificial flower concealing said nozzle and having its pistil formed by said nozzle.

In testimony whereof I have signed my name to this specification.

PIERRE DUBRAY.